United States Patent
Koleda

[11] Patent Number: 5,856,806
[45] Date of Patent: Jan. 5, 1999

[54] ANTENNA SUPPORT SLEEVE WITH FINGERLOCK

[75] Inventor: Eugeniusz Z Koleda, Herlev, Denmark

[73] Assignee: Nokia Mobile Phones Limited, Salo, Finland

[21] Appl. No.: 740,817

[22] Filed: Nov. 4, 1996

[30] Foreign Application Priority Data

Nov. 8, 1995 [GB] United Kingdom .................. 9522866

[51] Int. Cl.$^6$ .................................................. H01Q 1/24
[52] U.S. Cl. ........................... 343/702; 343/901; 439/748
[58] Field of Search .................... 343/702, 715, 343/900, 901, 903, 906; 439/745, 746, 748, 916; H01Q 1/24, 1/36

[56] References Cited

U.S. PATENT DOCUMENTS

| | | | |
|---|---|---|---|
| 2,735,932 | 2/1956 | Textrom et al. ......................... | 343/901 |
| 3,654,592 | 4/1972 | Primorac ................................ | 439/746 |
| 4,956,647 | 9/1990 | Kimura .................................. | 343/715 |
| 4,992,056 | 2/1991 | Douty et al. ........................... | 439/746 |
| 5,138,329 | 8/1992 | Saarnimo et al. ...................... | 343/702 |
| 5,168,278 | 12/1992 | Morita .................................... | 343/702 |
| 5,343,213 | 8/1994 | Kottke et al. .......................... | 343/702 |
| 5,699,070 | 12/1997 | Mischenko et al. ................... | 343/901 |

FOREIGN PATENT DOCUMENTS

| | | |
|---|---|---|
| 2 287 130 | 9/1995 | United Kingdom . |
| WO 94/06319 | 3/1994 | WIPO . |

OTHER PUBLICATIONS

Patent Abstracts of Japan, vol. 14, No. 18 (E–873), 16 Jan. 1990 & JP–A–01 261004 (Matsushita) 18 Oct. 1989.

*Primary Examiner*—Don Wong
*Assistant Examiner*—Tho Phan
*Attorney, Agent, or Firm*—Perman & Green, LLP

[57] ABSTRACT

A radio device comprising a housing having an opening and an internal retaining surface; an antenna support sleeve inserted in the opening and a rod antenna mounted for movement in the antenna support sleeve between extended and retracted positions; the sleeve including a resilient, outwardly-projecting finger which engages the retaining surface to prevent removal of the sleeve from the housing and the housing including an aperture through which the finger can be inwardly displaced using a tool, including a shank, to disengage the finger from the retaining surface, thereby enabling removal of the sleeve from the housing.

3 Claims, 4 Drawing Sheets

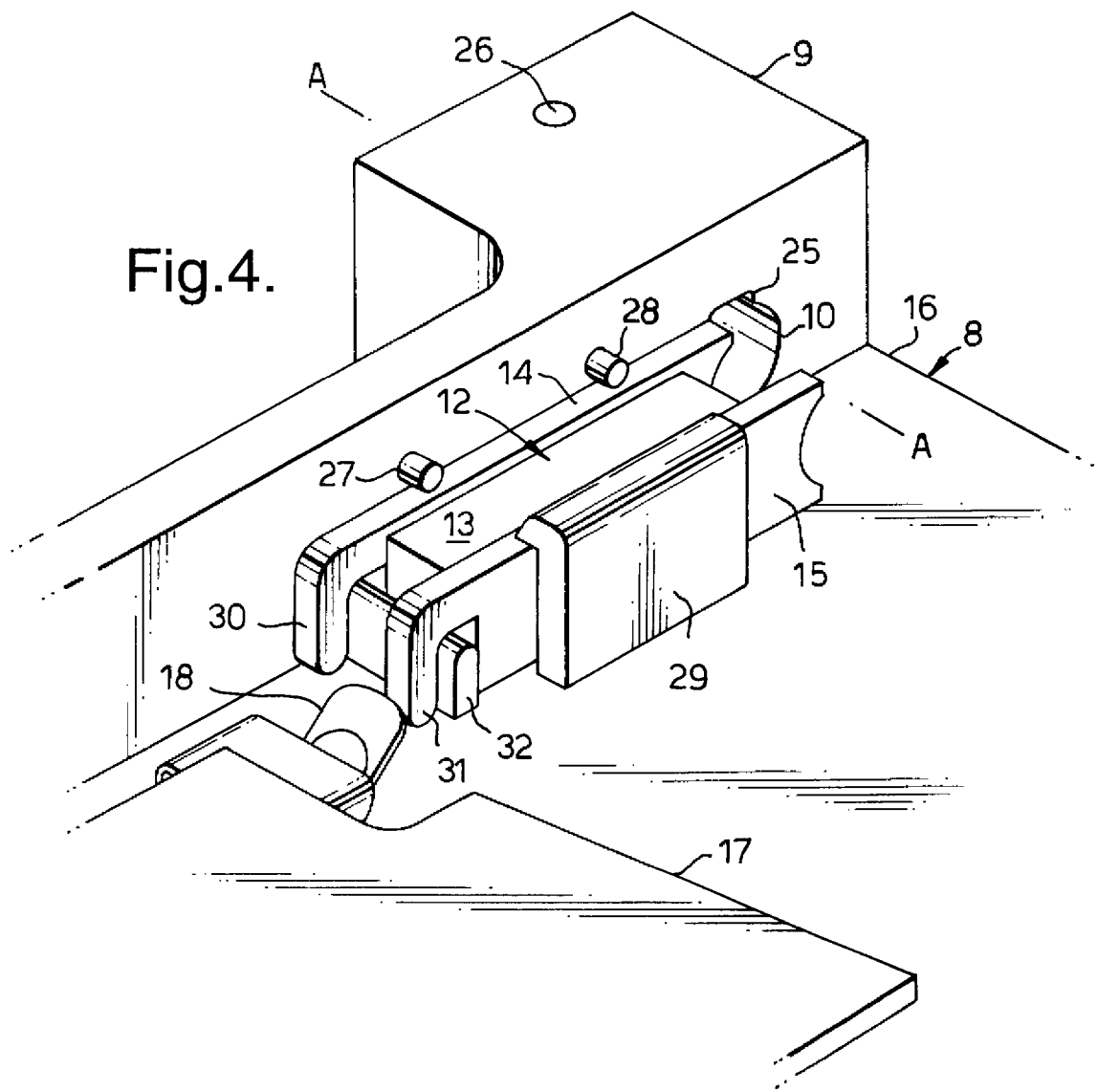

ANTENNA SUPPORT SLEEVE WITH FINGERLOCK

BACKGROUND OF THE INVENTION

The present invention relates to a radio device.

In such a device, it is known to equip a housing of the device with a rod antenna which can be retracted and extended through an opening in the housing. Damage to the rod antenna through snapping, bending or fracture can occur when the rod antenna is extended. It is, therefore, a requirement for the radio device that the damaged rod antenna be readily replaceable.

SUMMARY OF THE INVENTION

The present invention provides a radio device comprising a housing having an opening and an internal retaining surface; an antenna support sleeve inserted in the opening; and a rod antenna mounted for movement in the antenna support sleeve between extended and retracted positions; the sleeve including a resilient, outwardly-projecting finger which engages the retaining surface to prevent removal of the sleeve from the housing; and the housing including an aperture through which the finger can be inwardly displaced using a tool, including a shank, to disengage the finger from the retaining surface, thereby enabling removal of the sleeve from the housing.

Advantageously, the tool can be any implement available to the person changing the antenna which has a shank which is capable of passing through the aperture in the housing to displace the finger. In particular, it need not be a specialised tool dedicated to this task. It may be, for example, a suitably dimensioned pen, pencil or screwdriver. Preferably, the aperture is of sufficiently small dimensions to prevent small items from finding their way inside the housing and also to prevent the displacement of the finger by a human finger.

The wall portion of the housing defining the opening can include an elongate channel, one end of which is terminated by a shoulder, the shoulder constituting the internal retaining surface and preventing removal of the sleeve by withdrawal. Preferably, a collar is provided around one end of the sleeve in order to limit the insertion of the collar into the opening.

In accordance with a further embodiment of the invention (not illustrated), the sleeve can include more than one finger engaging one or more than internal retaining surfaces.

The radio device itself can be of any desired design and in particular may also take the form of a portable device. In the latter case, it may be for example a portable or cordless telephone or radiotelephone.

BRIEF DESCRIPTION OF THE DRAWINGS

FIG. 2 shows a sleeve for mounting the rod antenna to a housing of the radio device according to FIG. 1;

FIG. 4 shows an enlarged housing-side view of the device according to FIG. 1 ;

DETAILED DESCRIPTION

Figure 1:
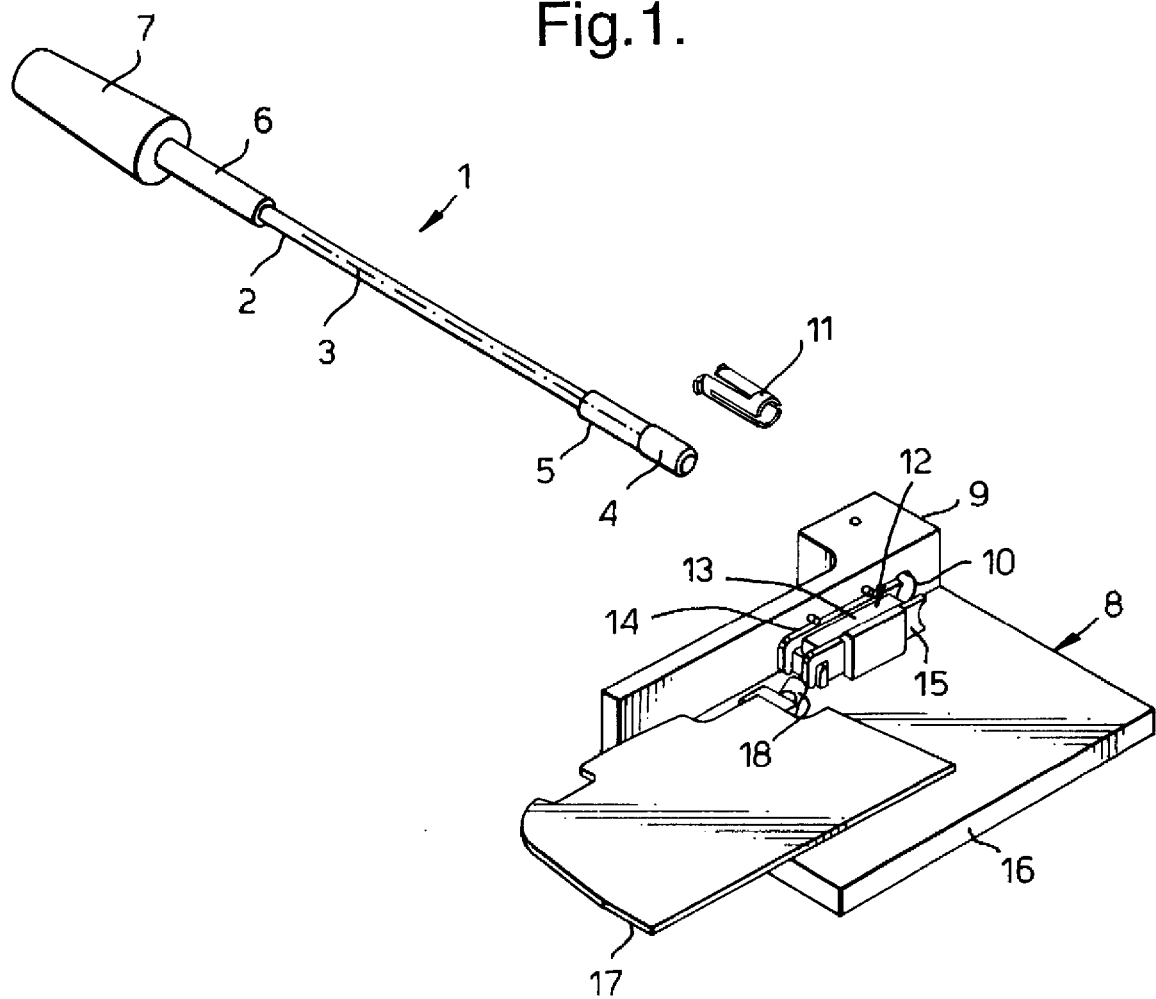
FIG. 1 shows an exploded view of a radio device in accordance with an embodiment of the invention.

Referring to FIG. 1, the rod antenna bears the reference symbol 1 and has a ferrite rod 2 made of an elastic and electrically insulating material, for example plastic, within which is encased an antenna feeder 3. The feeder 3 runs partially along the length of the ferrite rod 2. The antenna feeder 3 is shown in FIG. 1 by broken lines.

The antenna feeder 3 is connected in an electrically conductive way at its housing-side end to a first ferromagnetic section 4. A guide section 5 adjoins the first ferromagnetic section 4 in the direction towards the free end of the rod antenna 1. This guide section 5 can consist of any desired material, that is to say also of ferromagnetic material, and can be integrally connected to the first ferromagnetic section 4. The diameter of the guide section 5 is greater than that of the ferrite rod 2, while the diameter of the first ferromagnetic section 4 is greater than that of the guide section 5.

At its free end, the ferrite rod 2 has a second ferromagnetic section 6 which is not connected to the antenna feeder 3 which ends just before the second ferromagnetic section 6. The second ferromagnetic section 6 has a diameter equal to the diameter of the guide section 5. The second ferromagnetic section 6 bears a further antenna component 7 which contains a helix antenna in its interior, which helix antenna is connected in an electrically conductive way to the second ferromagnetic section 6. The further antenna component 7 can be a cast plastic element.

The rod antenna 1 is mounted to a housing 8 of the radio device in such a way that it can be pushed into the housing 8 as far as the further antenna component 7. It can be pulled out of the housing 8 by pulling manually on the further antenna component 7. However, in such a case the first ferromagnetic section 4 remains inside the housing 8 while the guide section 5 remains inside a wall 9 of the housing.

In order to retract and extend the rod antenna 1 into and out of the housing 8, there is a cylindrical through-opening or opening 10 formed in the housing inside the wall 9. A resilient sleeve 11 is inserted into this opening 10 in a push-fit manner. The sleeve 11 receives the rod antenna therethrough. The internal diameter of the sleeve 11 equals the external diameter of the guide section 5 and the second ferromagnetic section 6. The external diameter of the sleeve 11 equals the internal diameter of the opening 10.

The design of the sleeve 11 and its fitting in the opening 10 are described in detail later.

A magnet arrangement 12 is permanently attached to the inside of the housing wall 9. This magnet arrangement 12 comprises a permanent magnet 13 and two pole plates 14 and 15 on opposite sides of the permanent magnet 13. The pole plates 14 and 15 each lie in a plane which extends perpendicularly to the longitudinal direction of the opening 10, marked by the line A—A in FIG. 4. The pole plates 14 and 15 are of concave construction on their end side facing the opening 10, such that their end faces extend concentrically to the longitudinal axis of the opening 10. The radius of curvature of the concave end sides corresponds to the radius of the first ferromagnetic section 4.

The housing 8 of the radio device has a rear wall 16 on the inside of which a circuit board 17 is mounted upon which a transmitting and receiving circuit (not illustrated in greater detail) of the device according to the invention is entirely or partially located. In order to connect this transmitting and receiving circuit electrically, an elastic spring contact 18 is attached to the circuit board 17, which spring contact 18 presses against one of the pole plates, for example against the rear end face of the pole plate 15.

When the sleeve 11 is inserted into the opening 10 and the sleeve 11 receives the rod antenna 1 the latter can be pushed into the housing 8 with the exception of the further antenna component 7. When the rod antenna 1 has been pushed in to this extent the second ferromagnetic section 6 rests inside the sleeve 11, the length of the second ferromagnetic section 6 being selected such that this also rests in the region of the two pole plates 14 and 15. The magnetic flux of the magnet 13 is thus directed via the pole plates 14 and 15 through the second ferromagnetic section 6 so that in this position the rod antenna 1 is secured by the magnet arrangement 12. The second ferromagnetic section 6 fits into the interior of the sleeve 11 internal diameter of which is only slightly larger than the external diameter of the second ferromagnetic section 6. The antenna device which is present inside the further antenna component 7 is now electrically connected to the transmitting and receiving circuit on the circuit board 17 via the second ferromagnetic section 6, the magnet arrangement 12 or the pole plate 15 and the spring contact 18. In this state, the circuit can receive an externally transmitted signal.

When the rod antenna 1 is pulled out of the housing 8 in order to make a telephone call, the guide section 5 moves into the interior of the sleeve 11 while at the same time the first ferromagnetic section 4 comes to rest in the region of the two pole plates 14 and 15. The guide section 5 is guided through the sleeve 11 whose internal diameter is only slightly larger than the external diameter of the guide section 5 while the first ferromagnetic section 4 prevents the rod antenna 1 being pulled out completely from the housing 8. The first ferromagnetic section 4 has an external diameter which, as already mentioned, is larger than the external diameter of the guide section 5 so that the first ferromagnetic section 4 strikes against the end side of the sleeve 11 and thus serves as a stop. If the first ferromagnetic section 4 bears on the sleeve 11, the magnetic flux of the magnet arrangement 12 passes simultaneously via the pole plates 14 and 15 through the first ferromagnetic section 4 so that the latter is attracted by the magnet arrangement 12 and thus secured. In this state, the antenna feeder 3 is electrically connected to the transmitting and receiving circuit on the circuit board 17, if appropriate via the electrically conductive guide section 5, the first ferromagnetic section 4, the magnet arrangement 12 or the pole plate 15 and the spring contact 18. It is now possible to transmit and receive in order to make a call. If the guide section 5 were to consist of electrically insulating material, the antenna feeder 3 could pass through it and only be electrically connected to the first ferromagnetic section 4.

FIGS. 2 and 4 show, in an enlarged view, the sleeve 11 and the respective section of the housing 8, identical components to those in FIG. 1 being provided with the same reference symbols and not being described again.

Referring to FIG. 2, the sleeve 11 has a plurality of axial slots which start from different end sides of the sleeve 11. Three axial slots 19, 20 and 21 can be seen in FIG. 2, the axial slot 19 starting from the outer end side of the sleeve 11 while the axial slots 20 and 21 start from the inner end side of the sleeve 11. A resilient finger 22, which projects outwardly and radially from the central longitudinal axis of the sleeve 11, is formed by a wall region of the sleeve between the slot 19 and a further axial slot 23, which can only be seen in FIGS. 5 and 6. This further axial slot 23 also starts from the outer end side of the sleeve 11 and is adjacent to the axial slot 19. Both slots 19 and 23 extend not quite as far as the inner end side of the sleeve 11. This finger 22 extends not quite as far as the outer end side of the sleeve 11. The finger 22 is biased to adopt the radially extended position, shown in FIGS. 2, 5 and 6 where the finger diverges from a longitudinal axis of the sleeve 11. On application of an inwardly directed force, the biasing of the finger can be overcome to displace it into a non-radially extended position, where the finger 22 runs parallel with a longitudinal axis of the sleeve 11. In addition, a collar 24 is provided on the outer end side of the sleeve 11 (on the left in FIG. 2), the collar 24 preventing the sleeve 11 passing completely through the opening 10 when it is inserted into it.

The sleeve 11 has a certain degree of elasticity in the radial direction owing to the axial slots 19, 20, 21 and 23 which start from various end sides of the sleeve 11 and also to a further axial slot. It can thus be pressed over the first ferromagnetic section 4 of the rod antenna, the external diameter of which ferromagnetic section 4 is larger than the internal diameter of the sleeve 11 when it is in the radially extended state. In the non-radially extended state the internal diameter of the sleeve 11 corresponds to the external diameter of the guide section 5 or to the external diameter of the second ferromagnetic section 6.

Figure 3A:
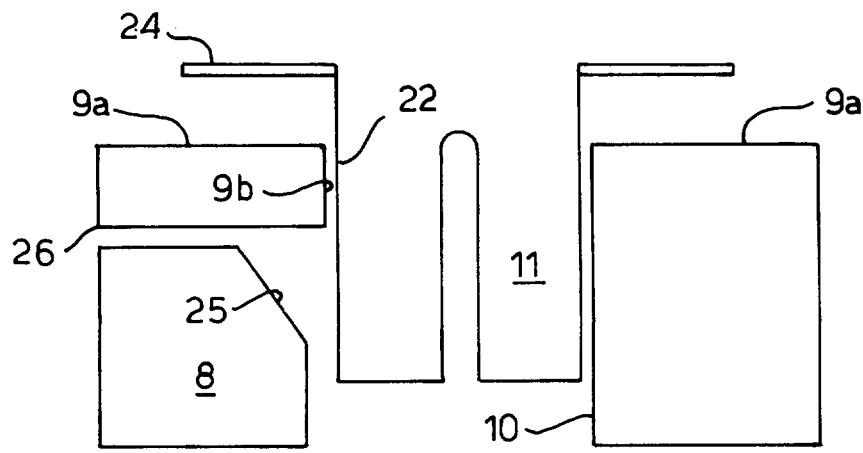
FIG. 3(a), 3(b) and 3(c) show views of the insertion and removal of the sleeve from the housing.
Figure 3B:
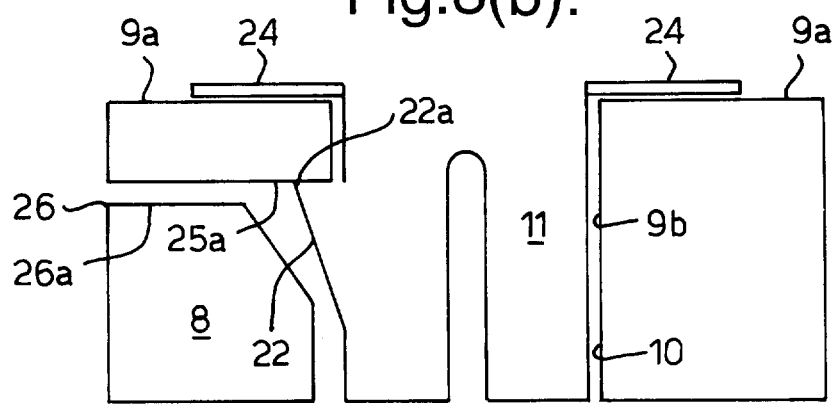

When the rod antenna 1 is received within the sleeve 11, the sleeve 11 can be pushed from outside into the opening 10 until the collar 24 strikes against a wall portion 9a, which is located around the mouth of the opening 10. As shown in FIG. 3(a) during this process, a wall portion 9b, defining the opening 10, holds the finger 22 in its non-radially extended position. As shown in FIG. 3(b), as the collar 24 bears against the wall portion 9a the finger 22 becomes free to adopt its naturally-biased position and jump or spring into an axial groove 25 formed in the wall portion 9b. This axial groove 25 extends from the inside of the wall 9 in the direction of its outside but terminating at a shoulder 25a. The length of the axial groove 25 is dimensioned such that when the sleeve 11 is completely inserted into the opening 10, as in FIG. 3(b), the end side or tip 22a of the finger 22, pointing in the direction of the outer end side of the sleeve 11, abuts against the shoulder 25a. In this way, axial securing of the sleeve 11 within the opening 10 is achieved.

As just described, on inserting the sleeve 11 into the opening 10 there was initial alignment of the axial groove 25 of the housing 8 and the finger 22 of the sleeve 11. This need not be the case. Without initial alignment, the sleeve 11 can be fully inserted into the opening 10 and then subsequently rotated to allow the finger 22 to spring out into the axial groove 25, and thereby axially secure the sleeve 11.

Figure 3C:
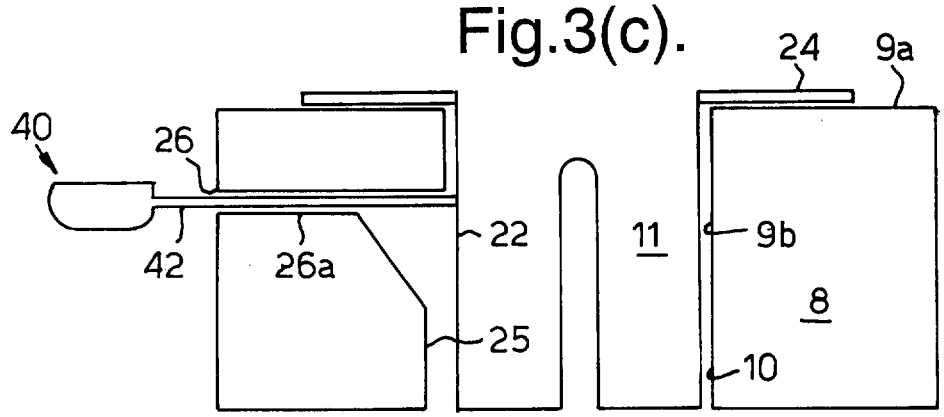

An aperture 26 is also provided in the housing. The aperture 26 provides entry to a passage 26a linking the aperture 26 at the exterior of the housing 8 and the axial groove 25 and hence the finger 22 when the sleeve 11 is located in situ in the opening 10. When the sleeve 11 is to be removed from the opening 10 in the direction of its outer end side, the finger 22 can be displaced inwardly in the direction of the centre of the sleeve 11 by means of a tool 40 having a thin shank 42 which can pass into the aperture 26 through the passage 26a and into engagement with the finger 22 as shown in FIG. 3(c). Any implement having a shank thin enough to enter the aperture 26, and long enough to extend along the passage 26a to reach the finger 22 and push it into its non-radially extended position is suitable. Examples include a pen, pencil or screwdriver. The dimensions of the aperture 26 are, however, too small to prevent access to the finger 22 by an average or even small human finger. This prevents accidental actuation of the finger 22. The sleeve 11 can then be pulled out of the opening 10 in the direction of its outer end side, and the rod antenna 1 can be pulled with it.

FIG. 4 shows the attachment of the magnet arrangement 12 in the interior of the housing 8. Two inwardly pointing projections 27, 28 are provided on the inside of the wall 9 and a clamp 29 is provided on the rear wall 16 of the housing 8 in order to receive the magnet arrangement 12 between them without play. Moreover, arms 30, 31 on the rear of the pole plates 14, 15 engage around a web 32 which is also attached to the rear wall 16 of the housing 8 in order to prevent the magnet arrangement being displaced in the direction of the opening 10.

Figure 5:
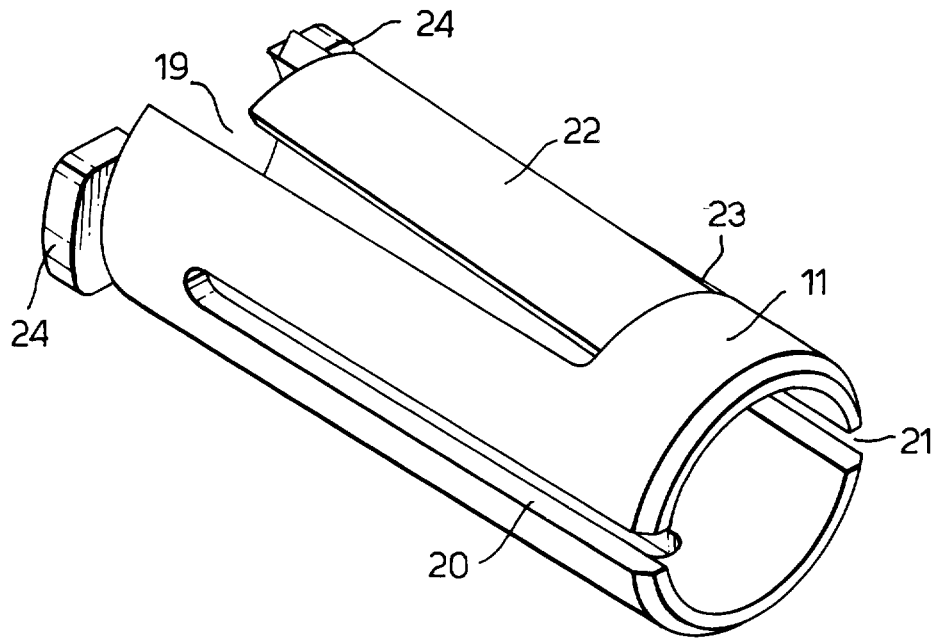
FIG. 5 shows the sleeve according to FIG. 2 in an enlarged view.
Figure 6:
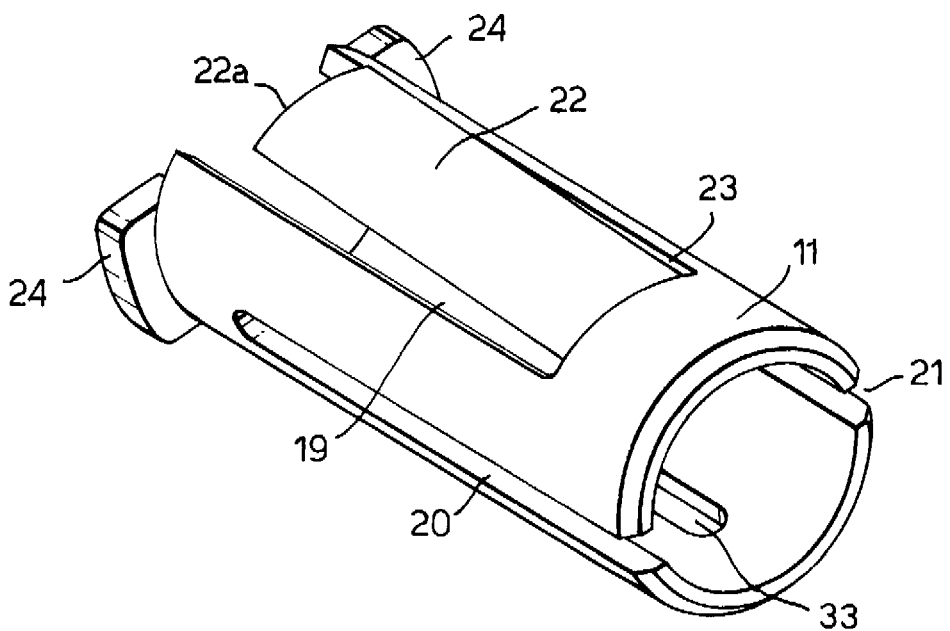
FIG. 6 shows the sleeve according to FIG. 2 in an enlarged view in a position rotated with respect to FIG. 5.

FIGS. 5 and 6 show once more the sleeve 11 in various rotational positions in enlarged view. Identical elements to those in FIG. 2 are provided here with the same reference symbols and are not described again. As is shown in particular by FIG. 5, a further axial slot 33, which comes to rest between the axial slots 20 and 21 but starts from the outer end side of the sleeve 11, on the left in FIG. 5, is also provided.

The sleeve 11 itself can consist of metal or plastic. In contrast, the housing 8, and in particular the wall 9 consist of electrically insulating material, for example, of plastic also. Although the rod antenna of the preferred embodiment is a ferrite rod antenna, any other type of rod antenna can be employed in the present invention.

It is a significant advantage of this preferred embodiment that the rod antenna 1 can be removed without taking the housing of the radio device apart using any suitable non-specialised tool which might be to hand.

What I claim is:

1. A radio device comprising:

a housing having an opening and an internal retaining surface;

an antenna support sleeve inserted in the opening; and a rod antenna mounted for movement in the antenna support sleeve between extended and retracted positions;

the sleeve including a resilient, outwardly-projecting finger which engages the retaining surface to prevent removal of the sleeve from the housing; and the housing including an aperture through which the finger can be inwardly displaced using a tool, including a shank, to disengage the finger from the retaining surface, thereby enabling removal of the sleeve from the housing.

2. A radio device as in claim 1, wherein the aperture is sufficiently small to prevent entry of a human finger.

3. A radio device as in claim 1, wherein the internal retaining surface comprises a shoulder formed in the wall portion of the housing which defines the opening.

* * * * *